United States Patent [19]

Turner et al.

[11] Patent Number: 5,999,542
[45] Date of Patent: *Dec. 7, 1999

[54] USE OF MODIFIED LINE ENCODING AND LOW SIGNAL-TO-NOISE RATIO BASED SIGNAL PROCESSING TO EXTEND RANGE OF DIGITAL DATA TRANSMISSION OVER REPEATERLESS TWO-WIRE TELEPHONE LINK

[75] Inventors: Michael D. Turner, Madison; Kevin W. Schneider, Huntsville; Richard A. Burch, Madison; Richard L. Goodson, Huntsville, all of Ala.

[73] Assignee: Adtran, Inc., Huntsville, Ala.

[*] Notice: This patent is subject to a terminal disclaimer.

[21] Appl. No.: 09/133,061

[22] Filed: Aug. 12, 1998

Related U.S. Application Data

[63] Continuation of application No. 08/560,812, Nov. 20, 1995, Pat. No. 5,809,033.
[60] Provisional application No. 60/002,491, Aug. 18, 1995.

[51] Int. Cl.[6] ....................................................... H04J 1/00
[52] U.S. Cl. ........................ 370/497; 370/203; 370/465; 370/522; 375/232; 375/298
[58] Field of Search ..................................... 370/310, 333, 370/465, 468, 472, 497, 522, 203, 207, 488; 375/232, 233, 242, 298; 455/13.1, 13.2, 13.3, 13.4

[56] References Cited

U.S. PATENT DOCUMENTS

| 5,162,812 | 11/1992 | Aman et al. | 375/34 |
|---|---|---|---|
| 5,388,124 | 2/1995 | Laroia et al. | 375/37 |
| 5,491,726 | 2/1996 | Cheng et al. | 375/343 |
| 5,495,470 | 2/1996 | Tyburski et al. | 370/14 |
| 5,561,687 | 10/1996 | Turner | 375/233 |
| 5,742,642 | 4/1998 | Ferther | 375/233 |
| 5,801,695 | 9/1998 | Townshend | 375/242 |
| 5,809,033 | 9/1998 | Turner et al. | 370/522 |
| 5,815,798 | 9/1998 | Bhagalia et al. | 455/13.4 |
| 5,844,944 | 12/1998 | Betta et al. | 375/298 |

OTHER PUBLICATIONS

"Combined Coding and Precoding for PAM and QAM HDSL Systems" by Gregory J. Pottie et al, *IEEE Journal on Selected Areas in Communications*, vol. 9, No. 6, Aug., 1991, pp. 861–869.

*Primary Examiner*—Dang Ton
*Assistant Examiner*—Shick Hom
*Attorney, Agent, or Firm*—Charles E. Wands

[57] ABSTRACT

The range of digital data communication services, such as a basic rate 2B1Q ISDN channel, to customer premises located beyond the industry standard achievable range of a two-wire loop can be extended by increasing the capacity of the ISDN line code from two information bits per symbol to three information bits per symbol, so as to reduce the effective symbol rate, which is error correction encoded to an effective 4B1H line code for defining a sixteen level PAM signal waveform, and employing enhanced low signal-to-noise ratio signal processing techniques in both the transmitter and receiver to accommodate the increased insertion loss of the two-wire line resulting from its extended length. Such enhanced low signal-to-noise ratio signal processing techniques include a Tomlinson precoder in the transmitter, and an adaptive linear equalizer and a module unit in the receiver.

28 Claims, 1 Drawing Sheet

USE OF MODIFIED LINE ENCODING AND LOW SIGNAL-TO-NOISE RATIO BASED SIGNAL PROCESSING TO EXTEND RANGE OF DIGITAL DATA TRANSMISSION OVER REPEATERLESS TWO-WIRE TELEPHONE LINK

CROSS-REFERENCE TO RELATED APPLICATIONS

This is a continuation of application Ser. No. 08/560,812, filed Nov. 20, 1995, now U.S. Pat. No. 5,809,033, issued Sep. 15, 1998.

The present application claims the benefit of U.S. provisional application No. 60/002,491 filed Aug. 18, 1995.

FIELD OF THE INVENTION

The present invention relates in general to communication systems, and is particularly directed to a new and improved encoding and signal processing scheme for extending the normal range of digital communications transported over a two-wire telephone wireline channel, such as, but not limited to, a high speed data service loop (HDSL), a digital data service (DDS) channel and an integrated services digital network (ISDN) channel, to distances (e.g. on the order of 25 Kft) well beyond those currently possible (typically on the order of 15–18 Kft for a basic rate ISDN channel) using a repeater-less two-wire transmission path.

BACKGROUND OF THE INVENTION

In order to meet various ANSI requirements for digital data communications, telephone subscriber copper wire lines must meet specified industry standard performance criteria, which limit the operational range of a two-wire loop. For example, in the case of currently installed ISDN basic rate digital subscriber lines (having a data rate of 160 kilobits per second, including bidirectional data payload and overhead maintenance channels), the ANSI standard T1.601 for 2B1Q (two-binary/one, quaternary/four level) modulation, two-wire, full-duplex data transport with echo cancellation, typically describes an ISDN channel as one that does not exceed a two-wire loop loss of 42 dB at 40 KHz, or 1300 ohms, resistive. As a consequence, the operational range of such a two-wire loop is limited to a range on the order of 15–18 kft, using No. 26 (American Wire Gauge) wire, and commercially available ISDN transceiver interface equipment.

To extend ISDN communications to the approximately twenty percent customer premises market that lies geographically beyond this range, it is necessary that the service provider either install repeaters in the loop, or use a different communication medium, such as a T1 carrier fiber optic link. Unfortunately, each of these alternative solutions to the extended range problem carries with it a substantial cost penalty that the customer is unwilling to bear.

For example, the repeater approach requires the installation of both an office end repeater powering unit, plus a repeater mounting pole, or a subterranean, environmentally hardened housing (bell jar) for the repeater. Not only does this involve the use of additional equipment (including the cost of the repeater hardware and its installation), but it entails the expense and labor of maintaining the repeater enclosure.

Similarly, although T1 channel banks, located in both the switch office and another downstream location (office or remote hut) that is geographically 'close' to the subscriber premises, are able to accept basic rate interface transmission extender (BRITE) cards for T1 carrier extension, the fact that T1 carrier systems are configured to include capacity for multiple extended basic rate services means that their use to deliver only a single basic rate extended service is prohibitively expensive and impractical.

SUMMARY OF THE INVENTION

In accordance with the present invention, the desire to extend the range of digital data communication services (such as a basic rate ISDN channel) to customer premises located beyond the presently achievable two-wire loop range (e.g. on the order of 15.2 kft for basic rate ISDN lines), without the above described cost penalty, is successfully addressed by: 1—changing the line code or modulation format; and 2—adopting enhanced signal processing techniques, which may be of the type employed in high bit rate digital subscriber line (HDSL) systems, to accommodate a diminished signal-to-noise ratio (resulting from the added insertion loss inherent in the extended length of the two-wire pair).

Considering the application of the present invention to the case of an ISDN channel, as a non-limiting example, advantage is taken of the availability of what have now become reasonably priced integrated circuit-based signal processing components, such as high speed digital application specific integrated circuit chips (digital ASICs), whose processing power and speed greatly reduces the cost of implementing a relatively sophisticated digital communication transceiver, particularly one that is intended to operate at data rates considerably reduced compared to the high speed data processing capacity of digital ASICs.

With the availability of these cheaper components, the overall cost of incorporating low signal-to-noise ratio signal processing techniques into a slower data rate transceiver, such as, but not limited to an ISDN device operating at only one-fifth the data rate of an HDSL scheme, is far less than that required to implement either of the conventional range extension approaches, described above, such as that involving the installation of a repeater.

Pursuant to a first aspect of the present invention applied to ISDN communications, the symbol rate of customarily employed 2B1Q ISDN line code modulation scheme for a basic rate ISDN channel is modified via an encoding and translation operator which achieves a reduction in symbol rate equivalent to transmitting three information or payload bits per symbol (a construct for which may be expressed as or represented by a 3B1O (three binary, one octal/eight level) line code), instead of the two bits per symbol that are transmitted using 2B1Q line code modulation. For a 160 kilobits per second ISDN basic rate interface, this initial symbol rate reduction of transmitting three information or payload bits per symbol instead of two bits per symbol means that the same number of information bits can be transmitted at two-thirds the standard symbol rate, or at a symbol rate of 53,333 symbols per second, which has the inherent property of increasing the transmission distance over the two-wire link that will comply with the above-referenced ANSI loss standards.

For this purpose, in the environment of a full-duplex data communication system, employing echo cancellation, with a transceiver (transmitter and receiver) installed at each end of the data transport link, the front end of a transmit section of a transceiver configured in accordance with the invention is coupled with a standard, basic rate ISDN transceiver interface U-chip which receives a basic rate (80 kilobits per second) ISDN signalling channel carrying 2B1Q signals (such as those sourced from a central office for transmission to a customer premises site, or sourced from a customer premises site to the central office). The U-chip is clocked so that it outputs 2B+D formatted digital signals (and overhead signals) to a framing unit, which assembles the digital signals and any accompanying overhead bits into a serial framing format, and outputs the respective bits of the serial frame to a serial data scrambler. The data scrambler randomizes the data so as to ensure full spectral occupancy of the transmission band on the transport link, enabling proper operation of adaptive elements in the receiver.

The scrambled serial data stream is converted into a three-bit parallel format by a serial-to-parallel converter and coupled to an error correction encoder, such as a trellis encoder, which forms part of the above-mentioned enhanced signal processing mechanism of the second aspect of the invention. The trellis encoder may introduce redundancy causing a rate of 4/3, so that it produces a four bit code from each group of three information bits. The trellis-encoded four bits are then translated or mapped via a code translator into a 4B1H (four bits, one hex/sixteen level) output line code—representative of one of sixteen levels of a pulse amplitude modulated signal to be transmitted per symbol.

As a non-limiting example, and maintaining compatibility with telephone industry standard parameters, the code translator may employ a sixteen-valued, one-dimensional linear signal space comprised of data points having relative values of: $-15, -13, -11, -9, -7, -5, -3, 1, +1, +3, +5, +7, +9, +11, +13, +15$. Thus, for each symbol, the 4B1H line code translator will output a respective four bit line code representative of one of the sixteen data values, as determined by the trellis-encoded value.

In order to accommodate a normally unacceptable reduction in signal-to-noise ratio that would inherently result from the insertion loss due to increased length of the two-wire loop, the second aspect of the invention further uses reduced signal-to-noise ratio signal processing techniques, such as Tomlinson precoding and adaptive equalization that are readily implemented using the available digital signal processing power of the previously mentioned relatively inexpensive, digital ASICs.

Such enhanced signal processing may further include coupling the 4B1H code translator to a Tomlinson precoder, which is operative to weight the PAM encoded signal in accordance with a prescribed filtering operator, which is equivalent to the feedback filter that would be used in a decision feedback equalizer located in the receiver section of the peer transceiver if Tomlinson precoding were not being used. Because the data has been trellis-encoded, however, a decision feedback equalizer cannot be used in the downstream receiver, since the two are mutually incompatible. This incompatibility problem is remedied by the use of the Tomlinson precoder in the transmitter, which achieves the same performance in the presence of intersymbol interference and noise as the use of a decision feedback equalizer in the receiver.

The Tomlinson precoder includes an adder which sums the four bit 4B1H code generated by the code mapping translator with the output of a multitap filter. The multitap filter may include an finite impulse response (FIR) filter and an optional infinite impulse response (IIR) filter, and has its weighting coefficients established during a training mode of operation, in which an adaptive equalizer in the receiver section is configured and operated as a decision feedback device. The multitap filter is coupled to receive the output of a modulo index operator unit in the Tomlinson precoder. The modulo index operator, termed a modulo unit, is operative to adjust the output of the adder, as necessary, based upon integral multiples of the magnitude of the range of the PAM coding space, such that the output of the unit falls within the coding range of the PAM signal (between the values: $-16$ and $+16$, for the above 4B1H line code example).

Because of the effect of the multitap filter, the value supplied to modulo unit will customarily be a non integer, whereby the output of the Tomlinson precoder has an effectively continuous signal characteristic. This effectively continuous, multi-bit, Tomlinson-precoded signal is applied through the combination of a digital-to-analog converter and low pass transmit shaping filter for transmission over the two-wire telephone channel by way of a line coupling circuit, such as a transformer interface unit.

In the receiver section, the two-wire loop is terminated via a line coupling circuit, the output of which is digitized by an analog-to-digital converter. The analog-to-digital converter is clocked by means of a recovered clock signal derived from a timing recovery circuit.

To remove the effects of transmit echo introduced by the transmit section of the local transceiver, the output of the analog-to-digital converter is differentially combined with the output of an adaptive echo replica filter in an echo-canceling unit. The adaptive echo replica filter is coupled to the output of the Tomlinson precoder in the transmit section and outputs a replica of the echo signal that is coupled from the transmit section through the line-coupling circuit to the local receiver.

The output of the echo canceler is coupled to an adaptive equalizer which, during normal operation is configured and operated as an adaptive linear equalizer. During a training mode, the device is configured and operated as a decision feedback device for the purpose of established weighting coefficients to be applied to the filter structure of the Tomlinson precoder at the far end of the link. During this training mode, the above-referenced error-correcting trellis encoder within the transmit section of the transceiver at the other end of the link is disabled.

Once the weighting coefficients of the decision feedback equalizer have adapted to steady state values, the coefficients are forwarded to the peer transmitter, and are used to set the tap values of the multitap filter of its Tomlinson precoder.

With the tap values of the Tomlinson precoder filter within the transceiver at the far end of the link set for normal operation, that transceiver's Tomlinson precoder filter is functionally equivalent to having installed a decision feedback equalizer in the receiver, but circumvents the incompatibility problem described previously. Upon completion of the training mode, the trellis encoder is enabled, and the decision feedback section of the adaptive equalizer of the receiver is disabled, so that the taps of the adaptive equalizer may operate in its normal mode.

The output of the adaptive equalizer is coupled to a further modulo unit which, like the modulo unit in the Tomlinson precoder of the transmit section, is operative to add or subtract an integral multiple (m) of the modulo value (i.e. m×32 in the present example of a dual polarity range from $-16$ to $+16$) from the output of adaptive equalizer, where (m) is a positive or negative integral multiple, so that the output of modulo unit in the receiver section will fall within the range of the one-dimensional signal coding space of the PAM signal. The output of this modulo unit is coupled to a Viterbi decoder, which decodes the modulo-translated signal value into a three bit parallel word, corresponding to the original group of three information bits input to the trellis encoder of the transmit section of the transceiver at the far end of the link.

The recovered three bit parallel data output by the Viterbi decoder is then converted into serial format by a parallel-to-serial converter, so that it may be descrambled by a serial descrambler which outputs the original successive data frames to a framing disassembly unit. The framing disassembly unit disassembles the frame-formatted digital signals into respective overhead signals and the original 2B+D signals. The 2B+D signals are coupled to an attendant U-chip, which outputs the original 2B1Q-formatted basic rate ISDN channel for delivery to an attendant destination device, such as customer premises terminal equipment.

DETAILED DESCRIPTION

Figure 1:
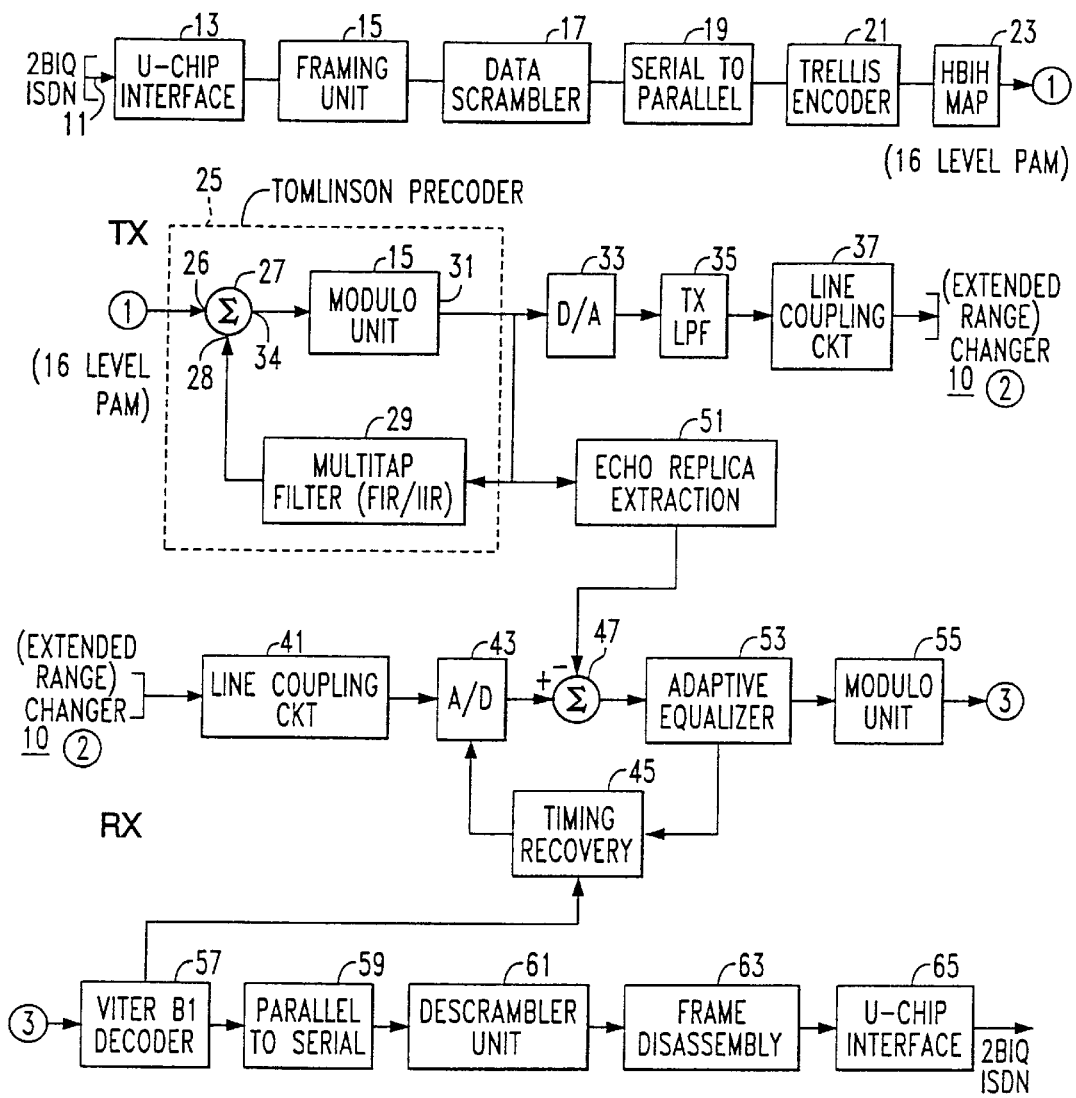
FIG. 1 diagrammatically illustrates a transceiver architecture in accordance with an embodiment of the present invention.

Before describing in detail the improved digital communication transceiver architecture of the present invention, that enables the range of digital communications, such as DDS, HDSL and ISDN services, to be extended well beyond their normal transport path length, it should be observed that the present invention resides primarily in what is effectively a prescribed set of conventional telecommunication signalling hardware components and attendant supervisory communications microprocessor circuitry therefor, that controls the operations of such components. Consequently, the configuration of such components and the manner in which they are interfaced with other communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present invention may be more readily understood. In terms of a practical hardware implementation, digital ASICs are preferred.

For purposes of describing an illustrative embodiment, the following description of the present invention will detail its application to extending the range of a basic rate ISDN channel over a two-wire telephone channel which, as noted previously, is customarily limited to a range on the order of 15–18 kft, using No. 26 (American Wire Gauge) wire, and commercially available ISDN transceiver interface equipment. It should be understood, however, that the ISDN communication environment described herein is merely an example of a digital signal transport environment to which the present invention may be applied and is not to be considered limitative of the invention. The architecture and signal processing functionality of the present invention is also applicable to solving the problem of extending the range of a variety of other digital communication transport mechanisms, such as DDS and HDSL systems, referenced previously.

As noted earlier, regardless of the communication environment, the invention takes advantage of the availability of application specific integrated circuit manufacturing processes to design and implement integrated circuit-based signal processing components, especially high speed digital ASICs, to enable the practical realization of a reasonably priced transceiver architecture. In the environment of a basic rate ISDN channel, since the transceiver operates at a symbol rate considerably lower than the high speed data processing capacity of the digital ASICs, the overall cost of incorporating enhanced encoding and noise reduction techniques into such a lower symbol rate transceiver is far less than that required to implement either of the conventional range extension approaches, described above, such as that involving the installation of a repeater.

Figure 2:
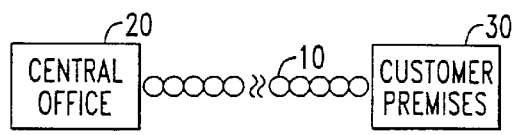
FIG. 2 diagrammatically illustrates a basic rate ISDN network architecture interconnecting a 'west' (central office) station and an 'east' (customer premises) station.

Referring now to FIG. 1, the new and improved range-extending telephone wireline transceiver architecture in accordance with an embodiment of the present invention is diagrammatically illustrated as comprising a transmit section Tx and a receive section Rx. It is to be understood that the transceiver architecture of FIG. 1 is employed in a full duplex communication configuration, wherein respective ones of the transceiver of FIG. 1 are installed at opposite ends of the extended communication channel of interest (e.g., a two-wire telephone loop), such as that diagrammatically illustrated at 10 in FIG. 2, connecting a central office 20 and a customer premises 30 served by that central office.

In the diagrammatic illustration of FIG. 1, transmit section Tx has an input port 11 coupled with a commercially available, basic rate ISDN transceiver interface U-chip 13, which customarily directly transports industry standard 2B1Q-formatted symbols of a basic rate (80,000 symbols per second) 2B1Q ISDN signalling channel (e.g. sourced from central office 20 for transmission to customer premises 30, or sourced from the customer premises 30 for transmission to the central office 20) with respective tip and ring leads of a local twisted cable pair loop.

As pointed out previously, one of the features of the present invention is the use of an increased capacity line code in place of the standard 2B1Q code of a basic rate 80 kilobits per second ISDN channel, so as to effectively reduce the symbol rate. As will be described, the invention operates in a manner that effectively achieves a reduction in symbol rate equivalent to transmitting three information or payload bits per symbol (a construct for which may be represented by or expressed a 3B1O (three information bits, one octal/eight level) line code), instead of the two bits per symbol that are transmitted using 2B1Q line code modulation. For the 160 kilobit per second basic rate interface, this construct transformation (from 2B1Q to 3B1O-equivalent) means that the same number of information bits can be transmitted at two-thirds the standard symbol rate, or at a reduced symbol rate of 53,333 symbols per second.

For this purpose, the U-chip 13 is clocked so that it outputs 2B+D formatted digital signals and overhead bits over a standard interface (such as an AT&T K2 Serial TDM Interface, a General Circuit Interface (GCI) or Interchip Digital Link (IDL)) to a framing unit 15, which assembles the 2B+D digital signals and accompanying overhead bits into a serial framing format and outputs the respective bits of the serial frame to a serial data scrambler 17.

Data scrambler 17 is operative to randomize the framed serial data, so as to ensure full spectral occupancy of the transmission band on the transport link, enabling proper operation of adaptive elements in the receiver. Data scrambler 17 may comprise a conventional feed-forward, modulo-two scrambler, containing a multistage shift register and exclusive OR circuitry coupled to selected stages thereof.

The unshielded twisted pair wireline channel has the characteristic that signal loss and near end crosstalk increase with frequency, so that reducing the signal bandwidth reduces the level of channel impairments. However, if the data rate is kept constant, a decrease in bandwidth requires that the distance between the amplitudes of adjacent symbols (e.g. between +1 and +3) is reduced (constant power), thus requiring a higher signal-to-noise or distortion ratio to provide the same probability of bit error. For the ISDN environment, three information bits per symbol has been determined to be a good choice.

Although this reduced symbol rate line code provides a performance improvement by reducing the signal bandwidth when compared to that of the standard 2B1Q signal, and could be used to define the characteristics of an eight level pulse amplitude modulated (PAM) signal, it is preferred to make the increased bits per symbol (three versus two) line code more robust by performing error correction encoding that will allow signal recovery circuitry at the receiver to accommodate a lower signal-to-noise ratio (associated with the increased insertion loss that accompanies a longer two-wire loop). In particular, using an error correction code that adds a single additional bit to the eight level three information bits per symbol signal results in a further line code expansion to four bits or sixteen levels of the PAM signal. (Using an error-correcting code with an increased number of signalling levels is known as coded modulation.) Although this further increase in code width also reduces the spacing between symbol data points for a given average transmit power, and thereby somewhat increases the line code's susceptibility to noise, this minor drawback is more than offset by the use of the coded modulation signal processing, to be described, which not only enables the receiver to tolerate the slightly reduced signal-to-noise ratio of a sixteen versus eight level PAM signal, but allows for the insertion loss resulting from an extension of the original range.

In order to 'wrap' or embed error correction around the data, the scrambled serial data stream from data scrambler 17 is first converted into a three-bit parallel format by a serial-to-parallel converter 19, and then coupled to an error correction encoder 21, such as a trellis encoder. The mapping of bits to levels is coordinated to the specific trellis code employed.

For purposes of providing a non-limiting example, trellis encoder 21 may introduce redundancy causing a rate of 4/3, so that it produces a four bit digital code from the three bit data supplied by serial-to-parallel converter 19. The trellis-encoded four bits generated by trellis encoder 21 are then translated or mapped via a code translator 23 into a 4B1H (four binary, one hex/sixteen level) output line code, which is representative of one of sixteen levels of a pulse amplitude modulated (PAM) signal to be transmitted per symbol.

As a non-limiting example, and maintaining compatibility with telephone industry standard parameters, code translator 23 may employ a sixteen level, one-dimensional (amplitude only, no phase component) linear signal space comprised of the sixteen relative levels: −15, −13, −11, −9, −7, −5, −3, −1, +1, +3, +5, +7, +9, +11, +13, +15. For each symbol, line code translator 23 outputs a respective four bit digital line code, corresponding to a sixteen level PAM signal, representative of one of the above sixteen data values, as determined by the trellis-encoded value of the three bit data output by scrambler 17.

Namely, pursuant to a first aspect of the present invention, the transceiver transforms the original digital data code width to a line code that effectively reduces the symbol rate. Since, in a communications environment such as a two-wire telephone channel, the near end cross-talk (NEXT) coupling and insertion loss increase with frequency, the signal-to-NEXT ratio therefore decreases with frequency and this reduction in symbol rate, from 80,000 symbols per second to 53,333 symbols per second in the present example, provides a reduced bandwidth occupancy and cross-talk, and lower link insertion loss all of which are associated with the invention's extended transmission range capability.

The 4B1H code generated by code translator 23 is coupled to a Tomlinson precoder 25. As described briefly above, Tomlinson precoder 25 weights the PAM-representative code in accordance with a prescribed filtering operator which is equivalent to the feedback filter that is used when a decision feedback equalizer is installed in the receiver section Rx of the transceiver. However, because the data is trellis-encoded by the trellis encoder 21, and a conventional decision feedback equalizer cannot be used in the receiver section of the downstream transceiver for trellis-encoded signals, the two are mutually incompatible.

This incompatibility problem is remedied by installing the Tomlinson precoder 25 in the transmit section and training the tap weights of the Tomlinson precoder filter with the trellis encoder disabled, as will be described. What results is a Tomlinson filter structure that is functionally equivalent to having installed a decision feedback equalizer in the receiver section Rx of the downstream transceiver.

The Tomlinson precoder 25 includes a subtractor 27, which has a first (+) input 26 coupled to receive the four bit 4B1H code generated by code mapping translator 23, and a second (−) input 28 coupled to the output of a multitap filter 29. The multitap filter 29 has the same structure as the feedback section of the decision feedback equalizer that is used to obtain its tap values. It may include an finite impulse response (FIR) filter stage, and an optional infinite impulse response (IIR) filter stage. Although the optional IIR filter stage is not necessary, its inclusion as part of the Tomlinson precoder filter may improve the overall performance of the transceiver, since the increased length of filter 29 (i.e., spanning more symbols) is reflected in a correspondingly longer adaptive equalizer in the transceiver section, that has the same structure as the Tomlinson precoder filter.

The input of multitap filter 29 is coupled to receive the output of a modulo unit 31, which is coupled to the output 34 of adder 27. Modulo unit 31 is operative to adjust, as necessary, the combined (summed) values of the 4B1H code and the filter output produced by adder 27, based upon integral multiples of the magnitude of the range of the PAM coding space (from −16 to +16), such that the output of modulo unit 31 falls within the coding range of the PAM signal, within boundaries defined by the symbol coding spaced endpoints (−16 and +16, for the above example). The effect of the modulo unit 31 is to ensure a stable feedback loop in the Tomlinson encoder 25 and to limit the amplitude of the transmit signal.

Because of the effect of the multitap filter 29, the value supplied to modulo unit 31 is, in all likelihood, a non-integer, so that the output of the Tomlinson precoder 25 will have an effectively continuous, multi-bit, Tomlinson-precoded pulse signal characteristic. This effectively continuous, Tomlinson-precoded pulse signal is applied through digital-to-analog converter 33 and a low pass transmit shaping filter 35 for transmission over the two-wire telephone loop 10, for application to the telephone channel 10 by means of a line coupling circuit, such as a transformer interface unit 37.

In the receiver section Rx, the two-wire loop 10 is terminated via a (transformer interface) line coupling circuit 41, which includes a low pass, anti-aliasing filter and the output of which is digitized by an analog-to-digital converter 43. Analog-to-digital converter 43 is clocked by means of a recovered clock signal derived from a timing recovery circuit 45.

To remove the effects of transmit echo introduced by the transmit section Tx of the local transceiver, the output of the analog-to-digital converter 43 is differentially combined in an echo-canceling combiner 47 with the output of an adaptive echo replica filter 51. Adaptive echo replica filter 51 is coupled to the output of the Tomlinson precoder 25 in the transmit section and outputs a replica of the echo component of the signal generated by the transmitter and all subsequent processing circuitry, that appears at the output of the A/D converter 43 and at the corresponding (+) input of combiner 47. The output of the echo canceling combiner 47 is coupled to an adaptive equalizer 53. Adaptive equalizer 53 may include a multi-tap filter structure, optionally recursive, for example of the type described on page 154 of the text "Adaptive Signal Processing," by B Widrow et al, Prentice-Hall, 1985. The multi-tap filter structure described in the referenced text is applicable to echo-replica filters (echo-cancellers), linear and decision feedback equalizers, and Tomlinson filters.

During a training mode of operation, the error-correcting trellis encoder 21 within the transmit section Tx is disabled, and the adaptive equalizer 53 in the receiver section Rx is operated as an adaptive decision feedback equalizer, such as that described in the U.S. Pat. No. 5,414,733 to M. Turner, entitled: "Decision Feedback Equalizer Employing Fixed Ratio Postcursor Taps for Minimizing Noise and Intersymbol Interference in Signals Conveyed Over High Speed Data Service Loop," which is assigned to the assignee of the present application and the disclosure of which is incorporated herein. Such an adaptive decision feedback equalizer typically consists of a linear feedforward portion and a decision feedback portion.

Once the weighting coefficients of the multitap filter structure of the adaptive decision feedback equalizer have converged, the coefficients from the decision feedback section of the decision feedback equalizer are transferred to the peer transmitter, and are loaded as tap values of the multitap filter 29 of its Tomlinson precoder 25.

With the tap values of the Tomlinson precoder filter 29 within the transmit section of the transceiver at the far end of the link now established, that transceiver's Tomlinson precoder filter 29 is now functionally equivalent to having installed a decision feedback equalizer in the receiver section of the local transceiver, but circumvents the incompatibility problem described previously. The decision feedback section of the adaptive equalizer 53 is disabled, and only the feedforward section of the adaptive equalizer 53 is employed, operating as an adaptive linear equalizer during normal operation, in which the trellis encoder 21 at the far end transmitter is re-enabled.

During normal operation, the output of the adaptive equalizer (now operating as an adaptive linear equalizer) is coupled to a further modulo unit 55 which, like the modulo unit 31 in the Tomlinson precoder 25 of the transmit section Tx, is operative to subtract an integral multiple (m) of the modulo value (i.e. m×32 in the present example of a dual polarity range from −16 to +16) from the output of adaptive linear equalizer 53, where (m) is a positive or negative integral multiple, to ensure that the output of modulo unit 55 in the receiver section Rx will fall within the range of the one-dimensional signal coding space of the effectively continuous PAM signal. The output of modulo unit 55 is coupled to a Viterbi decoder 57, which decodes the modulo-translated value of the received signal into a three bit parallel word, corresponding to the original group of three bits input to the trellis encoder of the transmit section of the transceiver at the far end of the two-wire loop.

The recovered three bit parallel data output by Viterbi decoder 57 is converted back into serial format by a parallel-to-serial converter 59, so that it may be descrambled by a serial descrambler 61. Descrambler unit 61 may comprise a conventional feed-forward, modulo-two descrambler, which is configured in a complementary fashion with respect to the scrambler 17 employed in the transceiver section Tx, described above. Descrambler 61 outputs the successive data frames that were assembled in the transmit section at the far end of the two-wire loop to a framing disassembly unit 63. The framing disassembly unit 63 then disassembles the frame-formatted digital signals into respective overhead signals and the original 2B+D signals. The 2B+D signals and overhead bits are coupled to an attendant U-chip 65, which outputs the original 2B1Q-formatted basic rate ISDN signal for delivery to an attendant destination device, such as customer premises terminal equipment.

From the foregoing description, it will be readily appreciated that extending the range of digital data communication services to telephone network customer premises located beyond the presently allowable range of a transport path such as a two-wire loop can be readily accomplished by increasing the capacity of the line code, to reduce the effective symbol rate, and by using enhanced (low signal-to-noise ratio environment) signal processing techniques to allow for the increased insertion loss of the longer/extended transport path.

As noted earlier, although the invention has been described for the specific example of its application to extending the range of a basic rate ISDN channel over a two-wire telephone channel, it is to be understood that such ISDN communication environment is merely an example of a digital signal transport environment to which the present invention may be applied and is not to be considered limitative of the invention. The architecture and signal processing functionality described above is also applicable to solving the problem of extending the range of other digital communication transport mechanisms, such as DDS and HDSL networks.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method for extending the distance for transporting digital communication signals from a first site to a second site, comprising the steps of:
   (a) converting first digital communication signals that are encoded at a first number of information bits per symbol at a prescribed data rate into second digital communication signals that are encoded at a second number of information bits per symbol, different from said first number, at said prescribed data rate; and
   (b) processing said second digital communication signals for transport to said second site.

2. The method according to claim 1, wherein said first and second digital communication signals comprise one of DSL signals, HDSL signals, DDS signals and ISDN signals.

3. The method according to claim 1, wherein said first number is two and said second number is three.

4. The method according to claim 3, wherein step (b) comprises processing said second digital communication signals for transport to said second site as 4B1H communication signals.

5. The method according to claim 1, further including the steps of:
(c) transporting said second digital communication signals to said second site; and
(d) receiving said second digital communication signals at said second site and processing said received second digital communication signals to recover said first digital communication signals.

6. The method according to claim 5, wherein step (a) comprises transporting said second digital communication signals over a two-wire telephone link to said second site.

7. The method according to claim 1, wherein said first digital communication signals comprise first ISDN communication signals, and step (a) comprises subjecting said first ISDN communication signals to an error correcting code that is effective to produce second ISDN communication signals having an increased number of bits per symbol, and wherein step (b) includes subjecting said second ISDN communication signals to Tomlinson preceding prior to transmission to said second site.

8. An arrangement for extending the transmission distance for basic rate integrated services digital network (ISDN) communication signals over a two-wire transmission path between a first site and a second site, comprising:
a line code converter which is operative to convert said basic rate ISDN communication signals encoded at a first number of information bits per symbol at a prescribed data rate into changed symbol rate ISDN communication signals that are encoded at a second number of information bits per symbol, different than from said first number, at said prescribed data rate; and
a signal processor which processes said changed symbol rate ISDN communication signals into output signals for transmission over said two-wire transmission path to said second site, and causes said output signals to be transmitted over said two-wire transmission path at said prescribed data rate.

9. The arrangement according to claim 8, wherein said output signals have a 4B1H line code.

10. The arrangement according to claim 8, wherein said second site includes a receiver which receives said output signals transported over said two-wire transmission path and recovers therefrom said basic rate ISDN communication signals.

11. An arrangement according to claim 8, wherein said line code converter is operative to convert said basic rate ISDN communication signals having a first, basic rate 2B1Q line code into first reduced symbol rate ISDN signals having three information bits per symbol, and wherein said signal processor includes an error correction encoder which performs error correction encoding of said first reduced symbol rate ISDN communication signals to transform said first reduced symbol rate ISDN communication signals into second reduced symbol rate ISDN communication signals having a 4B1H line code for transmission to said second site.

12. The arrangement according to claim 11, wherein said output signals to be transmitted over said two-wire transmission path have a one-dimensional symbol coding space, and wherein said second site includes a receiver which receives said output signals transported over said two-wire transmission path and recovers therefrom said basic rate ISDN communication signals, said receiver being operative to process received signals in accordance with a modulo index operator, which adjusts the output of said received signals, as necessary, to fall within said one-dimensional symbol coding space.

13. The arrangement according to claim 8, further including, at a respective site, an echo canceler coupled between said signal processor and said receiver.

14. A method for providing high-bit-rate digital subscriber line service over a two-wire telephone link, comprising the steps of:
(a) scrambling high-bit-rate digital data signals, having a first number of bits per symbol at a prescribed data rate, to be transported over said two-wire telephone link to produce randomized high-bit-rate digital data signals;
(b) subjecting said randomized high-bit-rate digital data signals to trellis coded modulation that produces encoded high-bit-rate digital data signals having a second number of bits per symbol, different from said first number of bits per symbol, at said prescribed data rate; and
(c) mapping said encoded high-bit-rate digital data signals into encoded pulse amplitude modulation signals for transport over said two-wire telephone link from a first site to a second site.

15. The method according to claim 14, wherein said randomized high-bit-rate digital data signals have a serial format, and step (b) includes performing serial-to-parallel conversion of said randomized high-bit-rate digital data signals to a K-bit parallel format, and wherein said trellis coded modulation produces encoded high-bit-rate digital data signals having a K+1 bit parallel format, and wherein step (c) comprises mapping said K+1 bit parallel format encoded high-bit-rate digital data signals into said encoded pulse amplitude modulation signals for transport over said two-wire telephone link to said second site.

16. The method according to claim 14, wherein step (c) comprises mapping said encoded high-bit-rate digital data signals into encoded pulse amplitude modulation signals having a four binary, one hex/sixteen level output line code.

17. The method according to claim 14, wherein step (c) comprises mapping said encoded high-bit-rate digital data signals into encoded pulse amplitude modulation signals having one of sixteen pulse amplitude modulation levels: $-15, -13, -11, -9, -7, -5, -3, -1, +1, +3, +5, +7, +9, +11, +13, +15$.

18. The method according to claim 14, further including the step (d) of processing said encoded pulse amplitude modulation signals produced in step (c) by means of a precoding filtering operator.

19. The method according to claim 18, wherein said preceding filtering operator comprises a Tomlinson precoder.

20. The method according to claim 18, further including the step (e) of converting the output of said precoding filtering operator into analog format and filtering the resultant analog signal for application to said two-wire telephone link.

21. The method according to claim 14, further including the steps of:
(d) transporting said encoded pulse amplitude modulation signals over said two-wire telephone link to said second site; and
(e) receiving said encoded pulse amplitude modulation signals at said second site and processing said received encoded pulse amplitude modulation signals to recover said high-bit-rate digital data signals.

22. An arrangement for providing high-bit-rate digital subscriber line service over a two-wire telephone link comprising:
- a data scrambler that is operative to scramble high-bit-rate digital data signals having a first number of bits per symbol at a prescribed data rate, and intended for transport over said two-wire telephone link, into randomized high-bit-rate digital data signals; and
- a trellis coded modulation encoder that is operative to subject said randomized high-bit-rate digital data signals to trellis coded modulation, producing encoded high-bit-rate digital data signals having a second number of bits per symbol, different from said first number of bits per symbol, at said prescribed data rate, and to map said encoded high-bit-rate digital data signals into encoded pulse amplitude modulation signals for transport over said two-wire telephone link from a first site to a second site.

23. The arrangement according to claim 22, further comprising a preceding filtering operator, that is operative to filter said encoded pulse amplitude modulation signals, a digital-to-analog converter that is operative to convert the output of said preceding filtering operator into an analog signal, and a spectral filter through which said analog signal is filtered for application to said two-wire telephone link.

24. The arrangement according to claim 23, wherein said precoding filtering operator comprises a Tomlinson precoder.

25. The arrangement according to claim 22, wherein said randomized high-bit-rate digital data signals have a serial format, and said trellis coded modulation encoder operative to perform serial-to-parallel conversion of said randomized high-bit-rate digital data signals to a K-bit parallel format, and to produce trellis encoded high-bit-rate digital data signals having a K+1 bit parallel format, and to map said K+1 bit parallel format trellis-encoded high-bit-rate digital data signals into said encoded pulse amplitude modulation signals for transport over said two-wire telephone link to said second site.

26. The arrangement according to claim 22, wherein said trellis coded modulation encoder is operative to map said encoded high-bit-rate digital data signals into encoded pulse amplitude modulation signals having a four binary, one hex/sixteen level output line code.

27. The arrangement according to claim 22, wherein trellis coded modulation encoder is operative to map said encoded high-bit-rate digital data signals into encoded pulse amplitude modulation signals having one of sixteen pulse amplitude modulation levels: $-15, -13, -11, -9, -7, -5, -3, -1, +1, +3, +5, +7, +9, +11, +13, +15$.

28. The arrangement according to claim 22, further including a receiver coupled to said two-wire telephone link at said second site, and being operative to receive said encoded pulse amplitude modulation signals and to process said encoded pulse amplitude modulation signals to recover said high-bit-rate digital data signals.

* * * * *